United States Patent [19]

Mochizuki et al.

[11] Patent Number: 4,736,076

[45] Date of Patent: Apr. 5, 1988

[54] CAPACITANCE SWITCHING DEVICE FOR KEYBOARD

[75] Inventors: Isao Mochizuki, Nannocho; Mitsumasa Kako, Tokai; Yoshihisa Masuda, Komaki, all of Japan

[73] Assignee: Brother Kogyo Kabushiki Kaisha, Nagoya, Japan

[21] Appl. No.: 27,485

[22] Filed: Mar. 18, 1987

[30] Foreign Application Priority Data

Mar. 27, 1986 [JP] Japan .................................. 61-69359
Apr. 1, 1986 [JP] Japan .................................. 61-74523

[51] Int. Cl.[4] ......................... H01G 5/01; H01H 13/52

[52] U.S. Cl. ............................ 200/52 R; 200/DIG. 1; 200/159 B; 361/288

[58] Field of Search .............. 200/5 A, 52 R, DIG. 1, 200/159 B, 306; 361/288; 340/365 C; 400/479, 479.1

[56] References Cited

U.S. PATENT DOCUMENTS

| | | | |
|---|---|---|---|
| Re. 30,435 | 11/1980 | Fukao | 200/DIG. 1 X |
| 3,696,908 | 10/1972 | Gluck et al. | 200/DIG. 1 X |
| 3,750,149 | 7/1973 | Sessler et al. | 340/365 C |
| 4,066,855 | 1/1978 | Zenk | 200/306 |
| 4,376,239 | 3/1983 | Long et al. | 200/5 A X |
| 4,659,879 | 4/1987 | Hasegawa | 200/DIG. 1 X |

FOREIGN PATENT DOCUMENTS 60-117512 6/1985 Japan .

*Primary Examiner*—J. R. Scott
*Attorney, Agent, or Firm*—Kane, Dalsimer, Sullivan, Kurucz, Levy, Eisele and Richard

[57] ABSTRACT

Disclosed is a capacitance keyboard switching device comprising a fixed electrode formed on one surface of a first insulating film, a movable electrode formed on one surface of a second insulating film, a spacer interposed between the first and second insulating films and provided with a switching opening formed through the spacer for allowing the fixed and movable electrodes to come close to and separate from each other with one of the first and second insulating films interposed between the fixed and movable electrodes, a movable electrode depressing member provided with a depressing portion for depressing the movable electrode to cause the movable electrode to come close to the fixed electrode through the one insulating film, in order to keep the movable electrode flat when the movable electrode is depressed toward the fixed electrode, the depressing portion is provided with a surface area selected to be larger than a surface area of the movable electrode so that the surface area of the depressing member completely covers the surface area of the movable electrode when the depressing portion depresses the movable electrode, or the second insulating film is provided with slots formed therein.

9 Claims, 7 Drawing Sheets

CAPACITANCE SWITCHING DEVICE FOR KEYBOARD

BACKGROUND OF THE INVENTION

1. Field of the Invention

The present invention generally relates to a capacitance switching device for a keyboard, and particularly relates to a capacitance switching device of the membrane switch type used for a keyboard or the like.

2. Description of the Prior Art

Conventionally, there has been proposed a capacitance switching device for a keyboard (hereinafter referred to as "a capacitance keyboard switching device") in which the switching operation is performed by a change in electrostatic capacity between a movable electrode and a fixed electrode caused when a key on the keyboard is depressed.

As the capacitance keyboard switching device of the type as described above, there have been proposed capacitance keyboard switching devices of the membrane switch type as shown in FIGS. 1 and 2.

FIG. 1 shows a main part of a conventional capacitance keyboard switching device 10 in a keyboard. In the drawing, a fixed electrode 14 is provided on a back or lower surface of a first insulating film 12 which is the base side of the capacitance keyboard switching device 10, and a movable electrode 18 is provided on a back or lower surface of a second insulating film 16 disposed above the first insulating film 12, the fixed electrode 14 and the movable electrode 18 being disposed in opposition to each other in a switching opening portion 20 of a spacer 22 with a certain gap defined by the spacer 22. In the thus arranged capacitance keyboard switching device 10, when a key 24 (partially shown) is depressed, a depressing portion 28 of a movable electrode depressing member 26 is lowered to thereby depress the second insulating film 16 together with the movable electrode 18, so that the movable electrode 18 is made to come close to the fixed electrode 14 through the first insulating film 12 so as to increase an electrostatic capacity of a capacitor formed between the fixed electrode 14 and the movable electrode 18 to a predetermined value to thereby allow an externally applied AC signal to pass therethrough. The key 24 is constituted by a key top 24*a*, a cylindrical portion 24*b*, and an abutment portion 24*c* as shown in FIG. 2. The reference numeral 30 designates a bottom portion of a casing of the keyboard. It is a matter of course that the keyboard is provided with numbers of such capacitance keyboard switching devices while only one capacitance switching device is illustrated in the drawing. This applies in the following cases.

In the generally used conventional keyboard switching device 10 as described above, however, upon depression the movable electrode 18 cannot be kept flat at its circumferential part when depressed, so that the movable electrode 18 is bent by the elastic recovery force of the second insulating film 16 within the switching opening portion 20 of the spacer 22. Accordingly, the movable electrode 18 cannot completely contact with the first insulating film 12 at a portion of the latter over the fixed electrode 14, resulting in variations in value of the electrostatic capacity formed between the fixed electrode 14 and the movable electrode 18 when the movable electrode 18 is depressed by the depressing portion 28. Consequently, there has been a disadvantage that a proper switching operation cannot be performed.

In order to eliminate the foregoing disadvantage, there has been proposed an improved capacitance keyboard switching device as disclosed in Japanese Patent Unexamined Publication No. 117512/1985, in which a first fixed electrode is provided between a movable electrode and a second fixed electrode to thereby form a capacitor having a fixed capacitance between the first and the second fixed electrode and a switching operation is performed in the state where the movable electrode is caused to abut on the first fixed electrode to thereby prevent such a phenomenon that the electrostatic capacity is varied depending on the condition of the key depressing operation.

FIG. 2 shows such an improved capacitance keyboard switching device 10*a*. In the drawing, a first insulating film 36 is disposed in opposition to a second insulating film 40 with a predetermined gap therebetween defined by a spacer 22, a first fixed electrode 32 and a second fixed electrode 34 are respectively provided on the lower and upper surfaces of the first insulating film 36 in opposition to each other, and a movable electrode 38 is provided on the lower surface of the second insulating film 40 in opposition to the second fixed electrode 34. In the thus arranged capacitance keyboard switching device 10*a*, when depressed/released by a key 24 the depressing portion 28 comes down/up within an opening portion 20 of the spacer 22 to thereby cause the movable electrode 38 to directly contact with-/separated from the second fixed electrode 34.

In such a conventional capacitance keyboard switching device 10*a* as described above, the fixed electrodes 32 and 34 are provided on the opposite surfaces of the first insulating film 36 to constitute a capacitor having a fixed capacity therebetween. Accordingly, it is necessary to form not only the fixed electrodes 32 and 34 but predetermined circuit patterns (not shown) on the opposite surfaces of the first insulating film 36, resulting in a problem that the structure of the keyboard switching device 10*a* is complicated to cause increase in manufacturing cost thereof.

SUMMARY OF THE INVENTION

It is therefore an object of the present invention to solve the foregoing problems in the prior art.

It is another object of the present invention to provide a capacitance keyboard switching device, in which a variation in an electrostatic capacity of a capacitor formed between a fixed electrode and a movable electrode when a switching portion is actuated is prevented from occuring and which is inexpensive in cost and simple in structure.

In order to attain the above objects, according to an aspect of the present invention, the capacitance keyboard switching device comprises a fixed electrode formed on one surface of a first insulating film, a movable electrode formed on one surface of a second insulating film, a spacer interposed between the first and second insulating films and provided with a switching opening formed though the spacer for allowing the fixed and movable electrodes to come close to and separate from each other with one of the first and second insulating films interposed between the fixed and movable electrodes, a movable electrode depressing member provided with a depressing portion for depressing the movable electrode to cause the movable electrode to come close to the fixed electrode through the one insulating film, the depressing portion is provided with a surface area selected to be larger than a surface area of the movable electrode so that the surface area of the depressing member completely covers the surface area of the movable electrode when the depressing portion depresses the movable electrode.

According to another aspect of the present invention, the capacitance keyboard switching device comprises a fixed electrode formed on one surface of a first insulating film, a movable electrode formed on one surface of a second insulating film, a spacer means interposed between the first and second insulating films and provided with a switching opening for allowing the fixed and movable electrodes to come close to and separate from each other with one of the first and second insulating films interposed between the fixed and movable electrodes, and slot means formed in the second insulating film at least one position around the movable electrode.

The above and other objects, features, and advantages of the present invention will be more apparent from the following description with reference to the accompanying drawings.

DETAILED DESCRIPTION OF THE PREFERRED EMBODIMENTS

Figure 3:
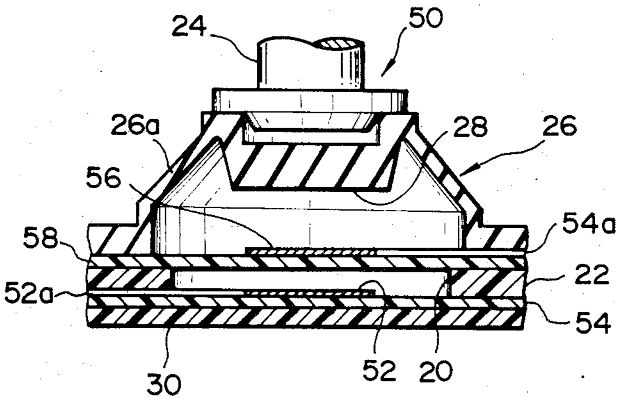
FIG. 3 is a cross section showing the main part of an embodiment of the capacitance keyboard switching device according to the present invention.
Figure 4:
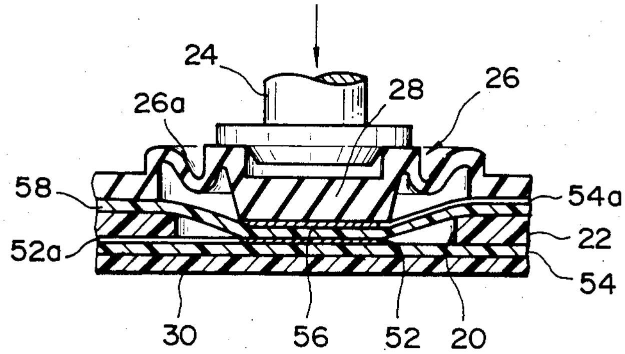
FIG. 4 is a cross section showing the embodiment of FIG. 3 in the state where the switching portion is depressed.

Referring to FIGS. 3 and 4, an embodiment of the capacitance keyboard switching device according to the present invention will be described hereunder.

Figure 1:
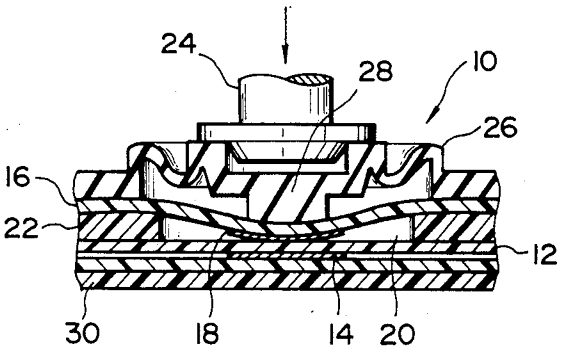
FIG. 1 (PRIOR ART)
FIG. 1 is a cross section showing the main part of an example of the conventional capacitance keyboard switching device.
Figure 2:
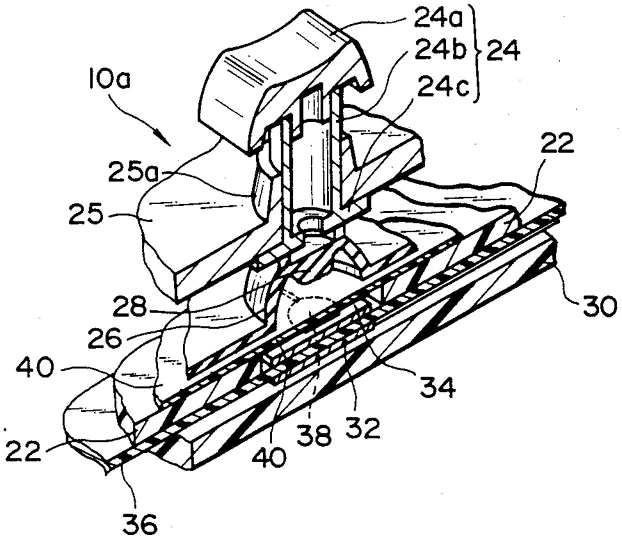
FIG. 2 (PRIOR ART)
FIG. 2 is a sectional perspective view showing the main part of another example of the conventional capacitance keyboard switching device.

This capacitance keyboard switching device 50 is constituted by a first insulating film 54 provided at its upper surface with a fixed electrode 52; a second insulating film 58 provided at its upper surface with a movable electrode 56; a spacer 22 having an opening portion 20 and interposed between the first and second insulating films 54 and 58; and a movable electrode depressing member 26 having a depressing portion 28, the depressing member 26 being arranged to abut at its upper surface on the lower surface of a partially shown operation key 24 which may be constituted in the same manner as that shown in FIG. 2. A support or bottom plate 30 of a casing of a keyboard is disposed under the lower surface of the first insulating film 54.

The first insulating film 54 may be a plastic film of a flexible material or a hard material, for example, a polyester film and the fixed electrode 52 and a predetermined conductor pattern **52*a* are formed on the upper surface of the first insulating film 54** through printing or etching process.

The second insulating film 58 may be a plastic film having a high dielectric constant and high flexibility, for example, a poly vinylidene fluoride film, and the movable electrode 56 disposed in opposition to the fixed electrode 52 and a predetermined conductor pattern **54*a* are formed on the upper surface of the second insulating film 58** through printing or etching process.

The spacer 22 is made of an insulating material, and the switching opening portion 20 is formed in the spacer 22 for causing the movable electrode 56 to come close to the fixed electrode 52 through the second insulating film 58.

The depressing member 26 shaped like a reversed cup is made of a high molecular material having elasticity, for example, rubber, and mounted on the upper surface of the second insulating film 58 for performing key switching action. The upper portion of the depressing member 26 is shaped like an annular rim so as to abut on the lower surface of the partially shown key 24. The depressing member 26 has a thin conical portion **26*a* integrally formed below the annular rim portion. The thick disk-like depressing portion 28 is integrally formed to project downward from the lower surface of the annular rim portion of the depressing member 26, and the lower surface of the depressing portion 28 is made to have an area larger than that of the movable electrode 56 so that the whole upper surface of the movable electrode 56 can be covered by the lower surface of the depressing portion 28 when the depressing portion 28 is moved downward to abut on the upper surface of the movable electrode 56**.

The capacitance keyboard switching device 50 is assembled in such a manner that the first insulating film 54, the spacer 22, and the second insulating film 58 are stacked one on one in this order and fixed with each other under the condition that the respective centers of the fixed electrode 52, the switching opening portion 20, the movable electrode 56, the depressing portion 28, and the key 24 are aligned on one and the same axial line. The conductor patterns **52*a* and 54*a* are connected to an electric circuit (not shown), and the opening/closing of the capacitance switching device is detected on the basis of a change in electrostatic capacity of a capacitor formed between the fixed electrode 52 and the movable electrode 56**.

Next, description will be made as to the operation of the thus arranged capacitance keyboard switching device 50.

In the case where the key 24 is not depressed, or in the state where the depressing portion 28 does not yet come into contact with the movable electrode 56 although the key 24 is being depressed, the fixed electrode 52 and the movable electrode 56 are fairly separated from each other through the second insulating film 58 and an air gap, so that the electrostatic capacity between the fixed electrode 52 and the movable electrode 56 is exceedingly small, and the switching device is in its opened state.

When the key 24 is further depressed, the movable electrode 56 is pressed by the depressing portion 28, and the second insulating film 58 is moved downward while being bent to thereby gradually decrease a gap between the upper surface of the fixed electrode 52 and the lower surface of the second insulating film 58, so that the electrostatic capacity between the electrodes 52 and 56 gradually increases corresponding to the decrease of the gap. At this time, in the depressing member 26, the conical portion 26*a* is deformed owing to the depressing operation of the key 24, and the depressing portion 28 is moved downward as the pressing load increases. When the key 24 is further depressed, the conical portion 26*a* is buckled to thereby suddenly decrease the pressing load, and this reaction gives an operator a click feeling.

As shown in FIG. 4, immediately after this click point, the second insulating film 58 abuts on the fixed electrode 52, so that the electrodes 52 and 56 are made to be in close opposition to each other with a very small distance, that is, a thickness of the second insulating film 58 having a high dielectric constant. As a result, the electrostatic capacity between the electrodes 52 and 56 becomes maximum so that the switching device is put in a closed state. At this time, the whole upper surface of the movable electrode 56 is covered and pressed by the depressing surface 28 having the area larger than that of the movable electrode 56, so that the movable electrode 56 is made to be in close opposition to the fixed electrode 52 through the second insulating film 58 while being kept in a flat state. Next, when the pressing load due to depression of the key 24 is removed, the depressing member 26 is restored to the original state by the elastic recovery force by itself, that is, the depressing portion 28 is separated from the movable electrode 56, so that the insulating film 58 is restored to the original state by the elastic recovery force by itself, and the movable electrode 56 is separated from the fixed electrode 52 to thereby decrease the electrostatic capacity to make the switching device opened.

Figure 5A:
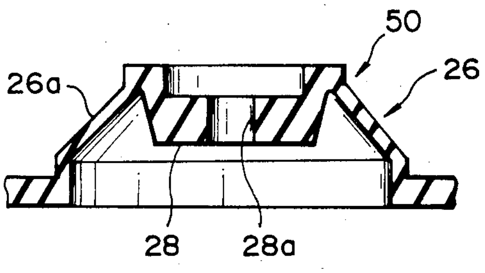
FIGS. 5A through 5C are cross sections showing various modifications of the embodiment of FIG. 1.
Figure 5B:
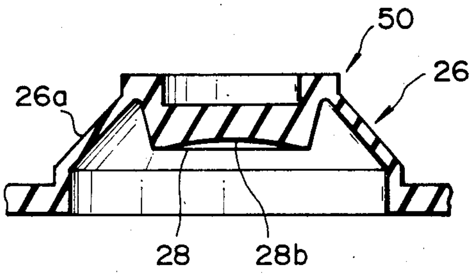

The present invention is not limited to the arrangement of the foregoing embodiment, but various modifications may be made. For example, the arrangement may be made such that an atmospheric pressure adjusting through hole 28*a* is formed in the center portion of the depressing portion 28 as shown in FIG. 5A, or the depressing portion 28 is formed to have a concave lower surface 28*b* as shown in FIG. 5B. In either case, the movable electrode 56 is moved downward while being kept flat to thereby obtain the same effects as those of the foregoing embodiment.

Figure 5C:
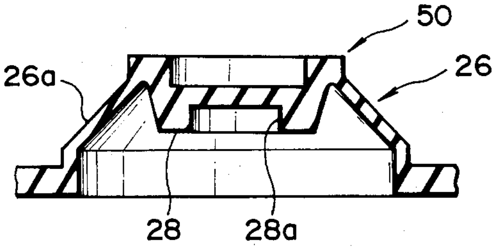

Further, as shown in FIG. 5C, the depressing portion 28 may be modified such that a recess portion 28*c* is formed at the center portion in the lower surface thereof to thereby make the shape thereof annular. In this case, the annular depressing portion 28 presses the movable electrode 56 such that the inner circumferential portion of the annular depressing portion presses the inside the outer circumferential portion the movable electrode 56 while the outer circumferential portion of the annular depressing portion 28 extends from the inside to the outside of the outer circumferential of the movable electrode 56 so that the movable electrode 56 can be pressed while being kept flat to thereby obtain the same effects as those of the foregoing embodiment. In all the cases, the area of the lower surface of the depressing portion 28 is made larger than that of the movable electrode 56 to thereby make it possible to provide the meritorious effects as described above.

As described above, in this embodiment of the capacitance keyboard switching device, the depressing portion presses the whole upper surface of the movable electrode to thereby bring the movable electrode into close opposition to the fixed electrode through the second insulating film while keeping the flat state of the movable electrode, so that the maximum electrostatic capacity can be formed in the capacitor formed between the fixed electrode and the movable electrode when the movable electrode is made to come into close opposition to the fixed electrode. Accordingly, a variation in electrostatic capacity due to a fluctuation in keying state when the switching device is closed, can be suppressed to thereby obtain high reliability, so that the ON/OFF operation of the keyboard switching device can be surely performed.

Further, the fixed electrode can be constituted by a printed substrate provided only at its one side with an electric conductor to thereby obtain an advantage that the cost of parts can be reduced and the arrangement can be simplified.

Next, referring to FIGS. 6 through 12, a second embodiment of the capacitance keyboard switching device according to the present invention will be described.

Figure 6:
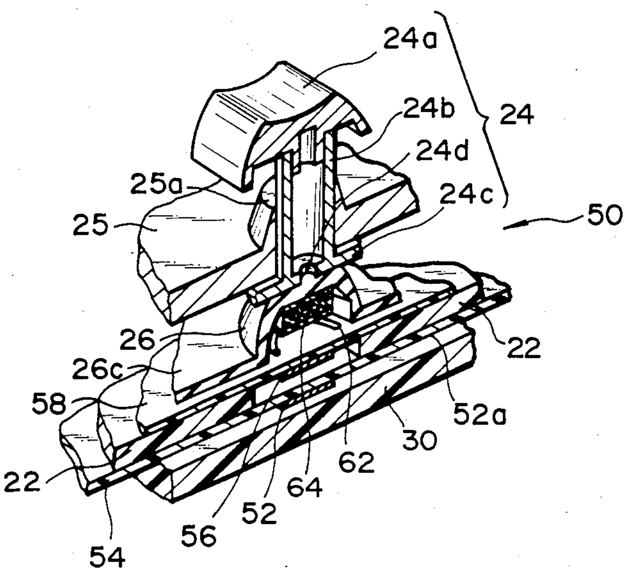
FIG. 6 is a sectional perspective view showing another embodiment of the capacitance keyboard switching device according to the present invention.
Figure 7:
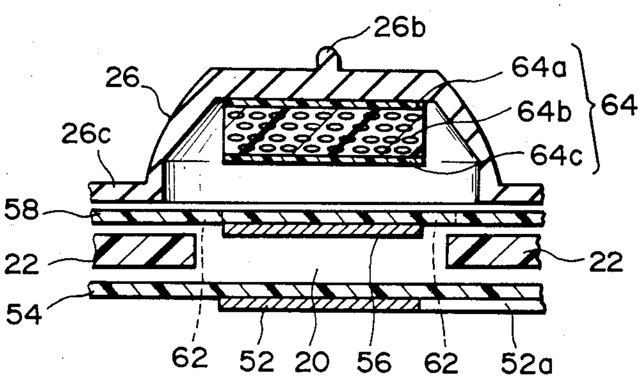
FIG. 7 is an enlarged cross section showing the main part of the switching portion of the embodiment of FIG. 6.

FIG. 6 is an exploded perspective view showing a main part of a capacitance keyboard switching device 50 in the second embodiment incorporated in a casing of a keyboard (not shown). In the drawing, a first insulating film 54, a second insulating film 58, and a spacer 22 interposed between the first and second insulating films are disposed between a bottom plate 30 and an upper plate 25 of the casing. A key 24 is vertically movably attached on the upper plate 25, and a movable electrode depressing member 26 is disposed above the second insulating film 58. The key 24 is constituted by a key top 24*a*, a cylindrical portion 24*b*, and an abutment portion 24*c*.

The first insulating film 54 is formed by a flexible film having non-conductivity and a high dielectric constant, and a fixed electrode 52 and a conductor pattern 52*a* thereof are formed on the lower surface of the first insulating film 54 through printing process with conductive ink or plating process with conductive metal, the fixed electrode 52 and the conductor pattern 52*a* being insulated from the bottom plate 30 through suitable means such as a resist layer or the like (not shown).

Figure 8:
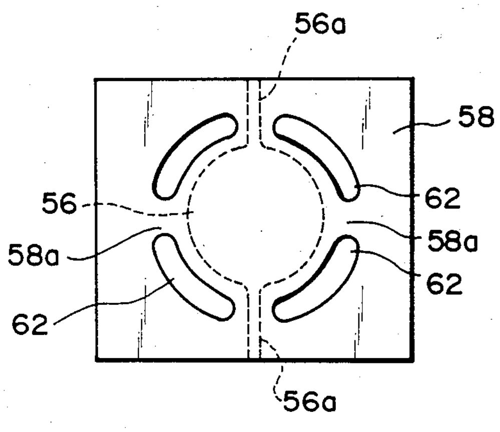
FIG. 8 is a plan view showing the second insulating film provided with slots in the embodiment of FIG. 7.
Figure 9:
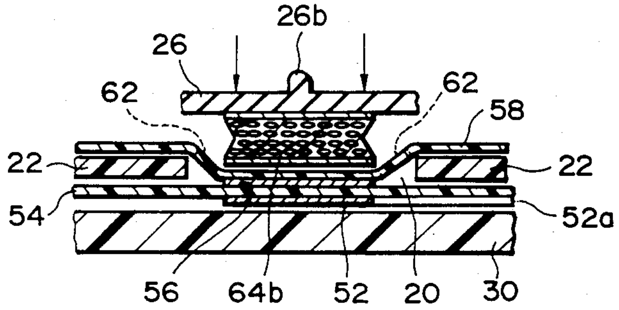
FIG. 9 is a cross section showing the state where the switching portion is depressed in the embodiment of FIG. 7.

Similarly to this, the second insulating film 58 is formed by a non-conductive flexible film, and a movable electrode 56 and a conductor pattern 56*a* are formed on the lower surface of the second insulating film 58 through printing process with conductive ink or plating process with a conductive metal, the movable electrode 56 being disposed in opposition to the fixed electrode 52 of the first insulating film 54. As shown in FIG. 8, arcuate slots 62 for making the movability of the movable electrode 56 sufficient are formed in the insulating film at portions around the movable electrode 56 except connecting portion 58*a* for supporting the movable electrode 56. That is, the movable electrode 56 is supported by the connecting portions 58*a*, and the rigidity of the second insulating film 58 owing to the elastic recovery force thereof is weakened by the slots 62, so that the movable electrode 56 is vertically movable with the whole thereof kept flat without being bent at its circumferential portion.

The spacer 22 is made of a non-conductive film, and a switching opening portion 20 is formed in the spacer 22 at a portion corresponding to the position where the fixed electrode 52 of the first insulating film 54 and the movable electrode 56 of the second insulating film 58 are disposed in opposition to each other, so that the movable electrode 56 can be made to come into close opposite to the fixed electrode 52 through the first insulating film 54 and to separate from the fixed electrode 52 owing to the thickness of the spacer 22.

The depressing member 26 is disposed in a predetermined position above the switching opening portion 20 of the spacer 22, and shaped to upward project so as to perform spring action. A depressing portion 64 is provided in the inside of the depressing member 26 for depressing the movable electrode 56 through the second insulating film 58. Although the depressing portion 64 may be formed integrally with the depressing member 26 as shown in the first embodiment, the depressing portion 64 is separately provided and attached to the depressing member 26 in this embodiment. That is, the depressing portion 64 is constituted by a sponge material **64*b* and an insulating layer 64*c* attached on the lower surface of the sponge material 64*b*, and bonded onto the lower surface of the depressing member 26 through an adhering layer 64*a*. The cylindrical portion 24*b* of the key 24 is inserted through a key holder portion 25*a* of the upper plate 25, and the abutment portion 24*c* of the key 24 are mounted on the depressing member 26. A projection 26*b* is formed at the center portion of the upper surface of the depressing member 26 and inserted into a hole 24*d* formed in the abutment portion 24*c* for preventing a displacement of the abutment portion 24*c* and the cylindrical portion 24*b* of the key 24 from occurring. Having suitable elasticity, the depressing member 26 is normally projected upward for supporting the key 24 thereon. When the key top portion 24*a* is depressed, the depressing member 26 is in turn depressed through the cylindrical portion 24*b* and the abutment portion 24*c***.

Thus, the capacitance keyboard switching device 50 accommodated in the casing is connected to an external AC signal source through predetermined electronic parts (not shown). When the key top portion **24*a* is not depressed, the fixed electrode 52 and the movable electrode 56 are in the separated state. When the key top portion 24*a* is depressed, the depressing portion 64 of the depressing member 26 abuts on the second insulating film 58 to thereby depress the movable electrode 56, so that the movable electrode 56 comes into contact with the first insulating film 54 within the switching opening portion 20 of the spacer 22. The slots 62 are formed through the peripheral portion of the movable electrode 56 to thereby weaken the hardness of the second insulating film 58 owing to the elastic recovery force thereof and therefore the whole of the movable electrode 56 comes into contact with the fixed electrode 52 through the first insulating film 54 to obtain a stable and satisfactory electrostatic capacity between the electrodes 52 and 56** so as to allow an AC signal to be transferred through the electrostatic capacity.

Figure 10:
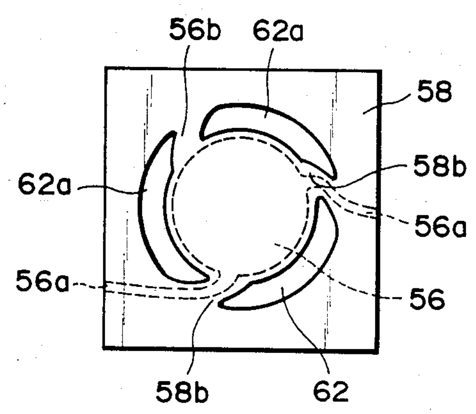
FIGS. 10 and 11 are plan views showing modifications of the second insulating film provided with slots in the embodiment of FIG. 8.
Figure 11:
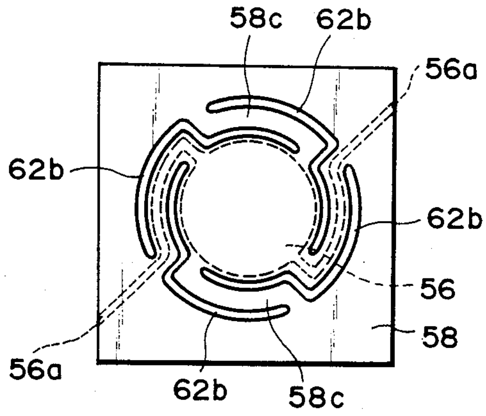

Although the four arcuate slots 62 are circumferentially symmetrically formed in the second insulating film 58 at portions around the movable electrode 56 except the predetermined connecting portions **58*a* in the foregoing second embodiment, the shape of the slots and/or the connecting portions is not limited to this embodiment. For example, three slots 62*a* and three connecting portions 58*b* may be provided at portions around the movable electrode 56 as shown in FIG. 10, or slots 62*b* and connecting portions 58*c* each having a complicated shape may be provided at portions around the movable electrode 56 as shown in FIG. 11**.

Figure 12:
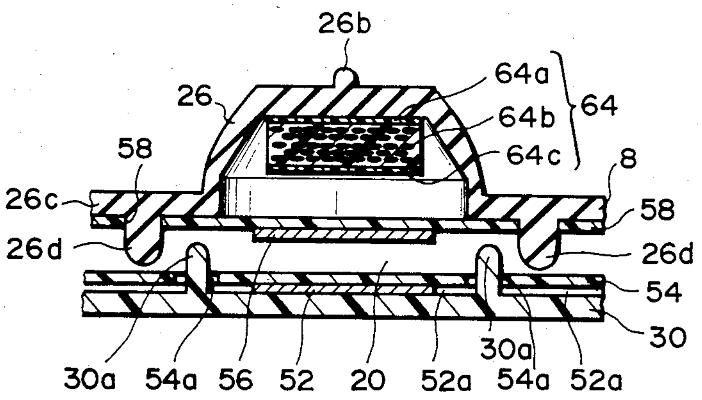
FIG. 12 is a cross section showing a further embodiment of the capacitance keyboard switching device according to the present invention.

The spacer 22 is formed by a non-conductive film in the second embodiment, however, the arrangement may be made such that, for example, as shown in FIG. 12, projections **30*a* are suitably formed on the bottom plate 30 of the casing so as to project upward through through holes 54*a* formed in the first insulating film 54 and projections 26*d* are formed on the sheet portion 26*c* of the depressing member 26 so as to project downward through through holes 58*a* formed in the second insulating film 58 to thereby form the switching opening portion 20 for allowing the movable electrode 56 to come close to and separate from the fixed electrode 52 through the first insulating film 54**. That is, means for forming the switching opening portion is not limited to the non-conductive film, but any means may be employed so long as it can form such a switching opening portion.

Further, although the capacitor used for switching operation is formed between the fixed and movable electrodes 52 and 56 by using, as a dielectric material interposed between the fixed and movable electrodes, the first insulating film 54 on which the fixed electrode 52 is formed in the second embodiment, it is a matter of course that both the fixed and movable electrodes 52 and 56 may be formed on the respective upper surfaces of the first and second insulating films 54 and 58 so as to use the insulating film 58 provided with the movable electrode 56 thereon as the dielectric.

In the foregoing embodiment according to the present invention, the slots are formed through at least one portion around the movable electrode to thereby suitably weaken the hardness of the insulating film portion supporting the movable electrode. Therefore, when the movable electrode is caused to come into contact with the fixed electrode, the whole of the movable electrode can be kept flat, so that it is possible to obtain a stable and satisfactory electrostatic capacity to perform a stable switching operation. Further, according to the present invention, it is not necessary to employ a both-sided substrate as used in the conventional capacitance keyboard switching device so that a capacitance keyboard switching device can be made simple in structure to reduce the cost thereof.

What is claimed is:

1. A capacitance keyboard switching device comprising:

- a fixed electrode formed on one surface of a first insulating film stationarily mounted on a support;
- a movable electrode formed on one surface of a second insulating film;
- a spacer interposed between said first and second insulating films and provided with a switching opening formed through said spacer for allowing said fixed and movable electrodes to come close to each other with one of said first and second insulating films interposed between said fixed and movable electrodes to separate the electrodes from each other;
- a movable electrode depressing member provided with a depressing portion for depressing said movable electrode to cause said movable electrode to come close to said fixed electrode with said one insulating film interposed between said fixed and movable electrodes, said depressing portion having a surface area larger than the surface area of said movable electrode so that the surface area of said depressing member completely covers the surface area of said movable electrode to thereby cause the entire movable electrode to uniformally move toward said fixed electrode.

2. A capacitance keyboard switching device according to claim 1, in which said movable electrode depressing member is shaped like a reversed cup and said depressing portion is formed at a top thereof, and a thin conical portion is formed integrally with and below said depressing portion.

3. A capacitance keyboard switching device according to claim 2, in which said depressing portion has a through hole formed at a center thereof.

4. A capacitance keyboard switching device according to claim 2, in which said depressing portion has a concave lower surface.

5. A capacitance keyboard switching device according to claim 2, in which said depressing portion has a recess in a lower surface thereof to form an annular rim portion on said lower surface.

6. A capacitance keyboard switching device comprising:

- a fixed electrode formed on one surface of a first insulating film stationarily mounted on a support;
- a movable electrode formed on one surface of a second insulating film;
- a spacer means interposed between said first and second insulating films and provided with a switching opening for allowing said fixed and movable electrodes to come close to and separate from each other with one of said first and second insulating films interposed between said fixed and movable electrodes; and
- slot means formed in said second insulating film disposed around said movable electrode to weaken said second film and thereby facilitate movement of said movable electrode.

7. A capacitance keyboard switching device according to claim 6, in which said second insulating film is disposed above said first insulating film and said fixed and movable electrodes are formed on respective lower surfaces of said first and second insulating films, and in which said device further comprises a reverse cup-shaped movable electrode pressing member including a top portion, a thin conical portion formed integrally with and below said top portion, and a depressing portion for depressing said second insulating film, said conical portion being positioned on an upper surface of said second insulating film, said top portion being made to abut at its upper surface on a lower surface of a key, so that when said key is manually depressed said depressing portion is lowered together with said top portion to thereby depress said second insulating film to cause said movable electrode to come into contact with said first insulating film to thereby form a capacitance between said movable electrode and said fixed electrode with said first insulating film interposed there between as a dielectric.

8. A capacitance keyboard switching device according to claim 7, in which said depressing portion is constituted by a sponge material and an insulating layer attached on a lower surface of said sponge material, and bonded onto a lower surface of said top portion through an adhering layer.

9. A capacitance keyboard switching device according to claim 7, in which a protrusion is formed on the upper surface of said top portion and inserted into a hole formed in the lower surface of said key.

* * * * *